US006980894B1

(12) United States Patent
Gordon et al.

(10) Patent No.: US 6,980,894 B1
(45) Date of Patent: Dec. 27, 2005

(54) METHOD OF MANAGING INTERFERENCE DURING DELAY RECOVERY ON A TRAIN SYSTEM

(75) Inventors: Susanna P. Gordon, Oakland, CA (US); John A. Evans, Hayward, CA (US)

(73) Assignee: San Francisco Bay Area Rapid Transit, Oakland, CA (US)

(*) Notice: Subject to any disclaimer, the term of this patent is extended or adjusted under 35 U.S.C. 154(b) by 0 days.

(21) Appl. No.: 10/742,714

(22) Filed: Dec. 19, 2003

Related U.S. Application Data

(62) Division of application No. 09/975,121, filed on Oct. 9, 2001, now Pat. No. 6,681,161, which is a division of application No. 09/291,814, filed on Apr. 14, 1999, now Pat. No. 6,332,107.

(51) Int. Cl.[7] .......................... G05D 3/00; G06F 17/00; B60L 3/00
(52) U.S. Cl. .................... 701/20; 701/19; 701/204; 701/205; 701/96; 246/182 R; 246/182 A; 104/299; 104/300; 104/301
(58) Field of Search .................... 701/19–20, 117–119, 701/204–205, 70, 93, 96, 201–202; 246/122 R, 246/125–126, 167 R, 187 R, 182 R, 1 R, 246/5, 169 R, 182 A, 187 C, 168; 340/901, 340/903, 909–911, 435–436, 933–938; 104/18, 104/27–31, 287, 295–301; 105/1.4, 1.5, 26.05, 105/446

(56) References Cited

U.S. PATENT DOCUMENTS 3,575,594 A * 4/1971 Elcan .......................... 246/2 R
3,835,950 A 9/1974 Asano et al. ............... 180/167

4,150,417 A 4/1979 Darrow et al. .............. 361/198

(Continued)

OTHER PUBLICATIONS

S.P. Gordon et al., "Coordinated Train Control and Energy Management Control Strategies", IEEE, Apr., 1998, pp. 165-176.

Primary Examiner—Jacques H. Louis-Jacques
(74) Attorney, Agent, or Firm—Pillsbury Winthrop Shaw Pittman LLP

(57) ABSTRACT

The present invention provides methods for preventing low train voltages and managing interference, thereby improving the efficiency, reliability, and passenger comfort associated with commuter trains. An algorithm implementing neural network technology is used to predict low voltages before they occur. Once voltages are predicted, then multiple trains can be controlled to prevent low voltage events. Further, algorithms for managing inference are presented in the present invention. Different types of interference problems are addressed in the present invention such as "Interference During Acceleration", "Interference Near Station Stops", and "Interference During Delay Recovery." Managing such interference avoids unnecessary brake/acceleration cycles during acceleration, immediately before station stops, and after substantial delays. Algorithms are demonstrated to avoid oscillatory brake/acceleration cycles due to interference and to smooth the trajectories of closely following trains. This is achieved by maintaining sufficient following distances to avoid unnecessary braking/accelerating. These methods generate smooth train trajectories, making for a more comfortable ride, and improve train motor reliability by avoiding unnecessary mode-changes between propulsion and braking. These algorithms can also have a favorable impact on traction power system requirements and energy consumption.

7 Claims, 7 Drawing Sheets

U.S. PATENT DOCUMENTS

| | | | |
|---|---|---|---|
| 4,235,402 A | 11/1980 | Matty et al. | 701/20 |
| 5,065,963 A * | 11/1991 | Usui et al. | 246/187 B |
| 5,293,632 A | 3/1994 | Novakovich et al. | 701/19 |
| 5,340,062 A | 8/1994 | Heggestad | 246/5 |
| 5,346,163 A | 9/1994 | Momma et al. | 104/301 |
| 5,366,183 A | 11/1994 | Gill | 246/28 R |
| 5,390,880 A * | 2/1995 | Fukawa et al. | 246/167 R |
| 5,452,870 A | 9/1995 | Heggestad | 246/182 R |
| 5,487,516 A * | 1/1996 | Murata et al. | 246/182 C |
| 5,623,413 A | 4/1997 | Matheson et al. | 701/117 |
| 5,647,562 A | 7/1997 | Lumbis et al. | 105/35 |
| 5,738,311 A | 4/1998 | Fernandez | 246/168 |
| 5,813,635 A | 9/1998 | Fernandez | 246/168 |
| 5,828,979 A * | 10/1998 | Polivka et al. | 701/117 |
| 5,890,682 A * | 4/1999 | Welk | 246/125 |
| 5,936,517 A | 8/1999 | Yeh | 340/435 |
| 5,947,423 A | 9/1999 | Clifton et al. | 246/62 |
| 6,125,311 A | 9/2000 | Lo | 701/19 |
| 6,135,396 A * | 10/2000 | Whitfield et al. | 246/182 R |
| 6,144,901 A * | 11/2000 | Nickles et al. | 701/19 |
| 6,154,735 A * | 11/2000 | Crone | 706/45 |
| 6,179,252 B1 * | 1/2001 | Roop et al. | 246/293 |

* cited by examiner

METHOD OF MANAGING INTERFERENCE DURING DELAY RECOVERY ON A TRAIN SYSTEM

REFERENCE TO RELATED APPLICATIONS

This is a divisional application of U.S. Ser. No. 09/975,121, filed Oct. 9, 2001, now U.S. Pat. No. 6,681,161, which is a divisional application of U.S. Ser. No. 09/291,814, now U.S. Pat. No. 6,332,107, filed Apr. 14, 1999.

STATEMENT OF GOVERNMENT INTEREST

The invention was made with Government support under contract no. DE-AC04-94AL85000 awarded by the U.S. Department of Energy. The Government has certain rights in the invention.

FIELD OF THE INVENTION

The present invention relates to the field of commuter-rail trains, and in particular to methods for improving the efficiency, reliability, and passenger comfort associated with commuter trains. Such improvements are achieved by providing methods for preventing low train voltages and managing interference.

BACKGROUND OF THE INVENTION

Commuter-rail train systems have been in existence for decades in various metropolitan and rural areas throughout the world. Generally, commuter trains are used to transport people from one location to another. As cities and towns become increasingly populous, more people rely on commuter trains as their primary means of transportation. Thus, commuter train efficiency, reliability, and passenger comfort are important issues for those operating and using the trains.

Although commuter trains are a popular method of commuting, improvements in this field are needed. For example, the possibility of delays among the trains is high. When such delays occur, commuter trains can be an unpredictable and unreliable means of commuting. Furthermore, conserving energy and infrastructure costs associated with commuter trains are ongoing considerations for those operating and managing the trains. In addition, improvements in passenger comfort are needed to attract more people to use commuter trains.

As is well known, many commuter rail systems use computers to automatically control their trains, rather than having drivers control the trains manually. These automatic train control systems use circuitry that is directly connected to the rails to locate and communicate with the trains. These circuits divide the track length into "fixed blocks," which can be between a hundred and a thousand feet long. Although these "fixed-block" systems can determine whether a train is present in a given block, they cannot determine where within the block the train is located. Such limitation leads to uncertainty in the location of the trains and requires trains to be separated by large distances for safety reasons. In addition, fixed-block systems typically limit the number of selectable train speeds because of limited communication bandwidth. Thus, trains sometimes must travel slower than the civil speed limit because of the limited number of speed commands. Furthermore, the station stops are affected by this limitation as trains slow down in a "stair-step" braking profile, which is characterized by periodic discrete drops in speed.

The limitations associated with fixed-block systems have prompted those in this field to develop a more efficient and reliable control system. Thus, "moving-block" control systems are being developed to provide a more precise method of locating trains, selecting speeds, and the like. These systems also allow trains to run more closely together, while decreasing the time required for a train to traverse a route. In addition, more sophisticated train control techniques can be used with the moving-block system.

These moving-block systems will enable methods for avoiding low voltages at trains and managing interference to improve the efficiency, reliability, and passenger comfort associated with commuter trains. A more detailed discussion regarding low voltages at trains and managing interference is addressed hereinafter.

Under normal conditions and in a majority of cases, the existing power infrastructure of the train system can sufficiently manage the trains during operation. However, in certain situations when there are power shortages resulting from, for example, multiple trains accelerating at a given time, the existing power infrastructure may be inadequate. For example, when several trains are close together and demand power simultaneously, the voltages at the trains can drop sharply. This results because there is only a limited amount of available power. Insufficient power may be due to track geometry and/or an outage at a traction power substation. When train voltage drops occur, train motor performance begins to degrade, and, for certain types of trains, the motors will eventually shut down to avoid damage from excessive current flow. Furthermore, even with those motors that do not shut down, it is inefficient to allow severe voltage drops because low voltages typically result in large power losses to heat in the rails.

When low voltages at trains occur, a conventional response is to add more power infrastructure until the system is sufficiently robust to handle any situation. Moreover, because the train system must continue to operate during outages, additional power capacity can be installed at substations so that the voltages will be maintained at some desired level during such outages. Rather than installing additional power in existing systems, enhanced control systems can instead be designed to regulate the power.

In the past, simple control strategies have been contemplated and/or employed to avoid low voltages at the trains. For example, one control strategy is to reduce train acceleration rates and top speeds to some arbitrary values. However, this technique has been shown to be ineffective for preventing low train voltages.

Another strategy to avoid low voltages is to use on-board control logic. The on-board controller could reduce power demand as the voltage drops, with power approaching zero as the voltage approaches the desired minimum. Further, the on-board controller could react quickly to a low voltage condition by reducing the power demand of a train in response to the train's measured voltage.

Alternatively, a wayside control approach, where train commands are generated by a computer in a fixed wayside location and then communicated to the trains, allows for more flexibility than the on-board approach. The wayside controller can take into account the train schedule and prioritize the allocation of power among the trains. For example, if two trains traveling in opposite directions are both accelerating, and there is only sufficient power available for one of them, then the on-board control solution would be to cut the power demand of each train in half. However, if one train is on time, and the other is behind schedule, then it may be desirable to allocate most of the power to the high priority train and allow the other to coast. A wayside-controlled algorithm allows such decisions to be made on a case-by-case basis.

An algorithm that prevents the voltage at each train from dropping below some minimum value by limiting power consumption can save energy infrastructure costs, in addition to reducing energy consumption. One objective of the present invention is to apply a control strategy that will allow rush hour traffic to continue operating on the system during a substation power outage with the minimum required power infrastructure. This can be achieved by slowing down trains as needed to keep the system operating smoothly with the available power. The payoff can be substantial because such a control strategy may be sufficient to delay the need for traction power system upgrades, which typically cost tens of millions of dollars.

In order for a wayside controller to maintain the voltage of all trains above some threshold, it must predict train voltages based upon the trajectories of all nearby trains. It may then allocate the available power in such a way as to maintain the voltage at all trains, while minimizing the impact on the schedule. Power consumption can rise quickly enough to take the voltage from a comfortable range to well below the desired minimum in a matter of seconds. Thus, it is insufficient to measure or calculate train voltages and react accordingly, but rather, potential low voltage problems must be recognized before they materialize. The present invention provides a method for recognizing and preventing such voltage problems before they materialize.

Managing interference is also very important to improve commuter train efficiency, reliability, and comfort. "Interference" occurs when a following train travels closely to a lead train such that the following train is forced to brake to maintain a safe following distance. Like cars on a densely packed highway, trains can accelerate and brake repeatedly in response to each other's movements, wasting energy, abusing the motors, and causing an uncomfortable ride for the passengers. Moving-block control systems will allow trains to run close to the minimum safe following distance, so any slight change to a train's trajectory or station dwell time may lead to interference. Removing unnecessary acceleration cycles with enhanced controls will have beneficial impacts on system reliability and energy costs.

As is well known, fixed-block control systems can also exhibit interference behavior. However, the severity of such behavior is moderated by the infrequent changes in train speed commands. In fixed block systems, trains are only given new speed commands when they or the train they are following cross from one fixed block into another. Moving-block control systems, on the other hand, will be capable of changing train speed commands at least once every second, and therefore could exhibit much more severe interference events.

Thus, in the present invention, different types of interference problems are addressed: "Interference During Acceleration"; "Interference Near Station Stops"; and "Interference During Delay Recovery." Managing interference under these conditions can improve passenger comfort, system efficiency and reliability without significantly increasing trip time. The present invention provides methods for dealing with different interference conditions.

SUMMARY OF THE INVENTION

These are some of the objectives of the present invention:
(1) to provide a method for avoiding large energy infrastructure costs associated with commuter trains;
(2) to provide a method for reducing overall energy usage associated with commuter trains;
(3) to provide a method for improving service reliability associated with commuter trains;
(4) to provide a method for improving passenger comfort associated with commuter trains; and
(5) to provide a method for minimizing trip time associated with commuter trains.

These and other objectives of the present invention are obtained by providing methods for avoiding low train voltages and managing interference. An algorithm implementing neural network technology is used to predict low voltages before they occur. The objective of using this type of algorithm is to control multiple trains in an area to prevent low voltage events. This method reduces traction power infrastructure requirements, which are largely driven by the need to prevent low voltages.

Methods for improving train trajectories during crowded, or "interfered" conditions are also provided in the present invention. These include methods for avoiding unnecessary brake/acceleration cycles during acceleration, immediately before station stops, and after substantial delays. Algorithms are demonstrated to avoid oscillatory brake/acceleration cycles due to interference and to smooth the trajectories of closely following trains. This is achieved by maintaining sufficient following distances to avoid unnecessary braking/accelerating. These methods generate smooth train trajectories, making for a more comfortable ride, and improve train motor reliability by avoiding unnecessary mode-changes between propulsion and braking. These algorithms can also have a favorable impact on traction power system requirements and energy consumption.

BRIEF DESCRIPTION OF THE DRAWINGS

These and other objectives and advantages of the present invention will become apparent and more readily appreciated from the following detailed description of the presently preferred exemplary embodiment of the invention taken in conjunction with the accompanying drawings, of which.

DETAILED DESCRIPTION OF THE PREFERRED EMBODIMENTS

The preferred embodiments of the present invention will now be described with reference to FIGS. 1–7, 8(a) and 8(b). The present invention is directed to methods for providing smoother train trajectories and reduced energy consumption and power infrastructure requirements by providing train control algorithms for low voltage avoidance and interference management. One skilled in the art will appreciate that various substitutions and modifications can be made to the examples described herein while remaining within the spirit and scope of the present invention.

Avoiding Low Train Voltage

One aspect of the present invention is to provide a method that prevents train voltages from falling below a minimum threshold in any situation. The minimum threshold voltage varies from one train system to another. The present method prevents low voltages at the trains by regulating power usage among the trains.

The present invention employs neural network technology to predict train voltages. Data from simulator runs are used to train a neural network to predict train voltages based on power demand patterns. Once the neural network predicts approximate train voltages, an algorithm according to the present invention calculates reduced acceleration commands so that the train voltages do not drop excessively.

In general, a neural network is a network of electronic neurons that is designed to take a pattern of data and generalize from it. For example, if the data are daily temperatures in Los Angeles over two or more years, a neural network should be capable of forming an output (e.g., data, graph, chart) describing the way temperature rises in the summer and falls in the winter. In essence, a neural network works by a sophisticated form of trial and error, or, stated differently, varies the strengths of the connections between neurons until the input yields the correct output. Thus, a neural network improves (learns) its performance on a particular task by trial and error, and furthermore, can be treated as a "black box." The neural network according to the present invention will be described in more detail below.

Figure 1:
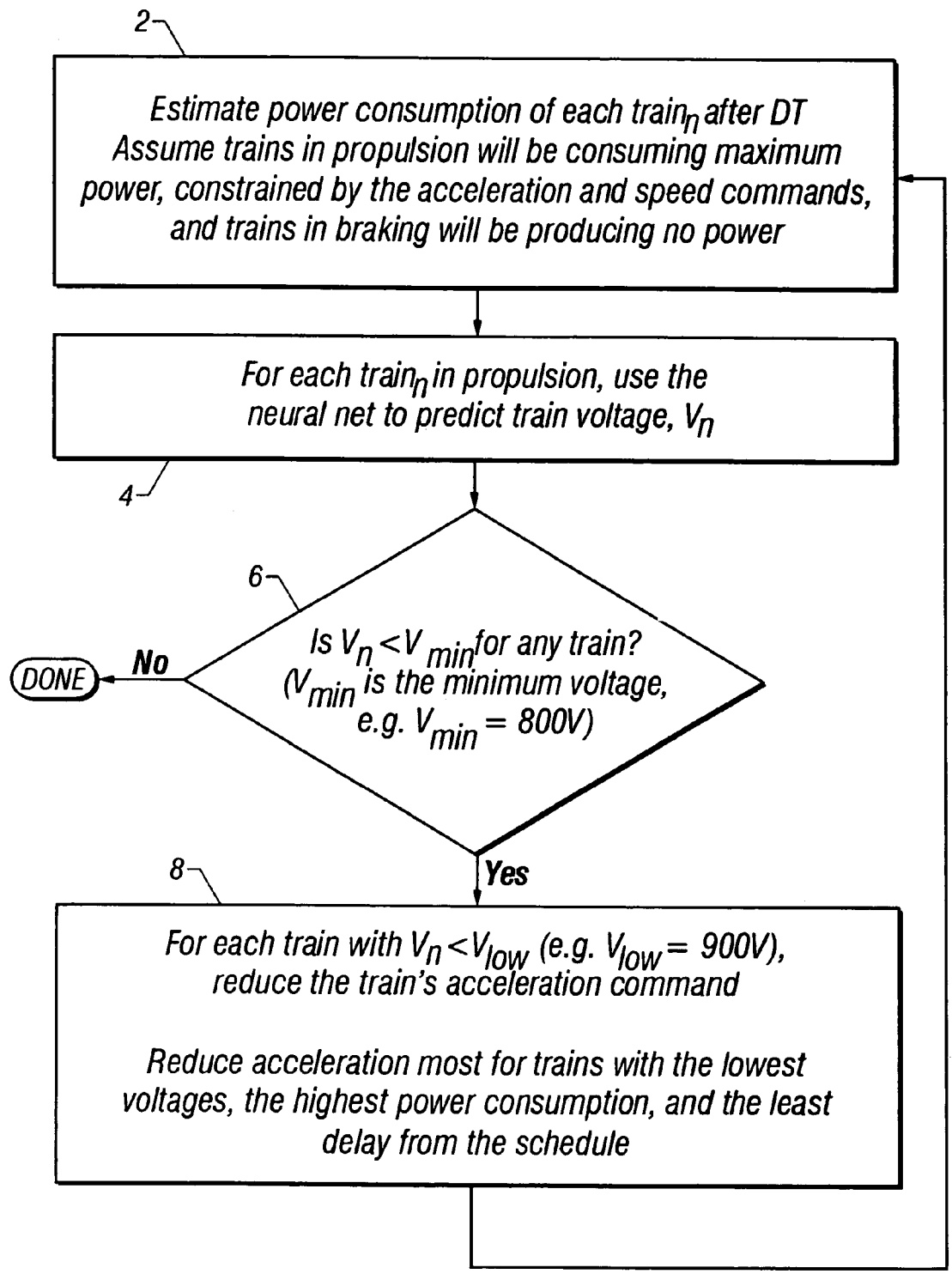
FIG. 1 illustrates a flow chart of a method for avoiding low train voltage in accordance with the preferred embodiment of the present invention.

FIG. 1 illustrates a flow chart of a method for avoiding low train voltages in accordance with the present invention. This method assumes that there will be a delay time (DT) of about one-second between the time when the train control commands are generated and when they go into effect. The DT may be more or less than one second depending on the overall train system. In the first step 2, the present method begins by estimating the power consumption of each train, train$_n$, projecting ahead by the delay time DT. Preferably, the present method assumes the worst case scenario for power consumption. In other words, it assumes that a train in propulsion will accelerate at full speed and consume maximum power, constrained only by maximum acceleration and speed control commands, and a train in braking will begin coasting and produce no power. (Braking trains can produce power through regeneration, but the algorithm does not assume this power will be available to the trains in propulsion.). If it is known more precisely what the trains will be doing DT in the future, then this information can be relied upon for the power calculations in step 2 rather than using the worst case assumptions described above.

Next, in step 4, the neural network is used to predict the train voltage $V_n$ for all trains that are consuming power, or in propulsion. The voltage of a train is calculated based on its location and the predicted power consumption of all nearby trains. Once all train voltages $V_n$ are predicted, the present method determines if any train voltage $V_n$ is below a minimum desired voltage $V_{min}$, e.g. 800V, in step 6. If all train voltages $V_n$ are greater than $V_{min}$, then the answer is "no" and the algorithm is completed. In this case, all acceleration commands are unadjusted.

However, if any of the predicted train voltages $V_n$ is less than $V_{min}$, then the answer is "yes" and some/all of the acceleration commands are reduced. For example, assuming that there are three trains with the predicted train voltages $V_n$ of 750V, 850V, and 950V and the minimum desired voltage $V_{min}$ is 800V, the answer in step 6 would be "yes" because one train voltage $V_n$ (750V) is less than $V_{min}$ (800V).

In step 8, assuming that one or more predicted train voltages $V_n$ is below the minimum desired voltage $V_{min}$, each train's voltage $V_n$ is compared to a low voltage $V_{low}$, e.g. 900V, to determine whether each $V_n$ is less than $V_{low}$. For those trains whose $V_n$ is less than $V_{low}$, the corresponding acceleration commands are reduced. In the example provided above, the trains corresponding to 750V and 850V will have their acceleration commands reduced. In general, several trains must consume power simultaneously to cause the voltage at any train to drop below $V_{min}$, but not all of these trains may have voltages quite this low. Thus, the present invention provides early detection and prevention of train voltages below $V_{min}$ by reducing the acceleration commands of all trains with predicted voltages less than $V_{low}$, which is greater than $V_{min}$. Although the example provided herein assumes that $V_{min}$ and $V_{low}$ are 800V and 900V, respectively, the present invention can be implemented with voltage levels having different values and range.

In more detail, the acceleration command of a train whose voltage $V_n$ is less than $V_{low}$ is reduced by a factor related to the severity of the voltage sag and the power consumption of the train. For example, the train's acceleration command may be multiplied by the factor $$e^{-(V_{sag}/300)^2 \cdot (P/0.7)}, \tag{1}$$

where $V_{sag} = V_{low} - V_n$ in volts, and P is the predicted power consumption of the train in megawatts. From multiplier (1), the farther below $V_{low}$ that a train's voltage $V_n$ drops, the more its acceleration command is reduced by this multiplier. The power factor P is included in multiplier (1), because a train's voltage can potentially drop due to power consumption by other nearby trains. A train with low voltage and low power consumption is in some sense an innocent bystander, experiencing a low voltage but not causing it. The acceleration commands to trains with both low voltages and high power consumption are preferentially reduced, because these are the trains primarily contributing to the low voltage condition. A factor relating to the train schedule can be included as well in the multiplier (1), so that trains that are close to being on schedule are preferentially slowed down in deference to those that are delayed. The power factor, the delay factor, and the specific exponential function described above are not critical to the operation of the algorithm. The important requirement is that train acceleration and/or power demand is reduced for trains with low voltages.

Once step 8 is completed, this process is repeated again from step 2 until all trains' calculated voltages $V_n$ are above $V_{min}$. The acceleration command to each low voltage train is reduced once, and then the worst-case power demands are recalculated with the reduced acceleration commands. Train voltages are again predicted by the neural network, and this process (steps 2–8) is repeated until there are no trains with predicted voltages below the minimum voltage. In general, the algorithm of the present invention does not have a large impact on train trajectories unless an abnormal control situation occurs.

The neural network of the present invention will now be described in greater detail with reference to FIGS. 2–3. As one skilled in the art can appreciate, applying neural networks to predict train voltages is a complex process due to the large number of possible train configurations and the variations in power substation configurations. The neural network of the present invention is trained to predict train voltages in a region of track a few miles long with a fully functioning traction power system. A separate neural network should be trained for each power system configuration. For example, if an outage at a particular substation is of concern, then a neural network should be trained to predict train voltages during an outage at that substation, and this network should be used by the logic described above during such an outage.

A neural network generally requires input/output information for training. In the present invention, the initial set of training data consists of the location, power consumption, and voltage of trains generated by a train control and traction power simulator. Data is created representing both nominal and off-nominal train behaviors, such as interference and backups. Various numbers of trains are made to interfere in various areas of the track in an effort to simulate the entire spectrum of train control situations. At the same time, an effort is made to limit the total number of training data points, because minimizing the size of the training data set reduces the training time, allowing faster performance evaluation.

In the tested version of this concept, a data set of about 14000 input and output data points was used for the neural net training. Each time the back-propagation algorithm processed a complete set of the input/output data, a root-mean-square (RMS) error was calculated between actual train volts and neural net predicted train volts. As long as the general trend of the RMS error was downward, the training was improving. Conversely, a trend upward of the RMS error indicated the weights were becoming unstable and training needed to be terminated. When there was no change in the RMS error, this meant the network was finished or stuck.

Figure 2:
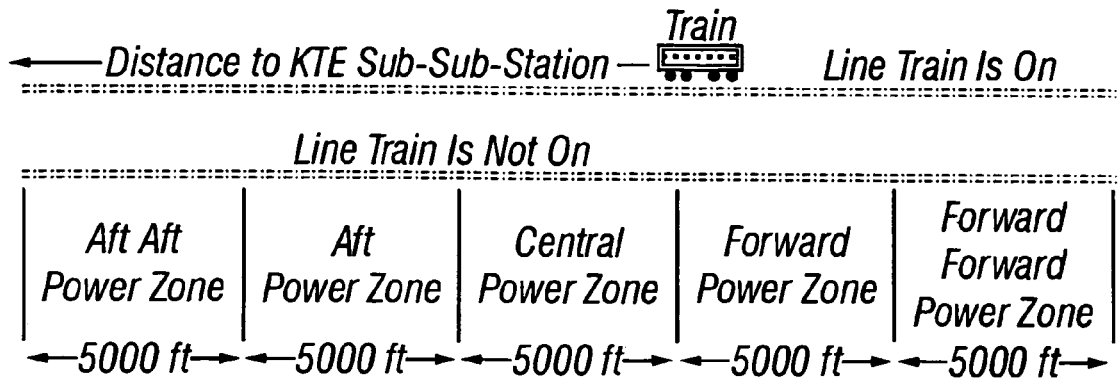
FIG. 2 illustrates a diagram of inputs for neural network voltage prediction in accordance with the preferred embodiment of the present invention.

FIG. 2 illustrates a diagram of inputs for neural network voltage prediction in accordance with the preferred embodiment of the present invention. The 11 inputs of the neural network architecture are also described in FIG. 3. The first input is the distance of the train from one end of the neural-net-trained length of track (e.g. KTE Substation in the figures). The remaining 10 inputs are power consumption aggregated in various track "zones" in the vicinity of the train. The first power zone is centered on the location of the train and is about 5000 feet long. In addition, there are two 5000-foot-long power zones on either side of the center zone. The zone nearest the front of the train is designated the forward zone and the one further away is designated the forward—forward zone. Likewise, the aft zones are designated behind the train. "Forward" and "aft" here are directions with respect to the distance origin (e.g. KTE Substation in FIG. 2), and are not correlated to the train's direction of travel.

Two neural network inputs correspond to each of these five zones, one for the power consumption on the track/line that the train is on, and one for the power on the opposing track/line. The "opposing track" is the parallel track on which trains travel in the opposite direction with respect to the train of interest. The same neural network is used to predict the voltage of trains on either track, because the two tracks are symmetric with respect to the power infrastructure. Thus, there is no distinction between trains on one track versus the other for voltage prediction. The only noteworthy distinction is whether the power demand in the area is on the same track as the train whose voltage is being calculated, or on the opposite track. This is because the high voltage third rails for the two tracks are tied together in few locations, so voltages on the two tracks can be substantially different.

Figure 3:
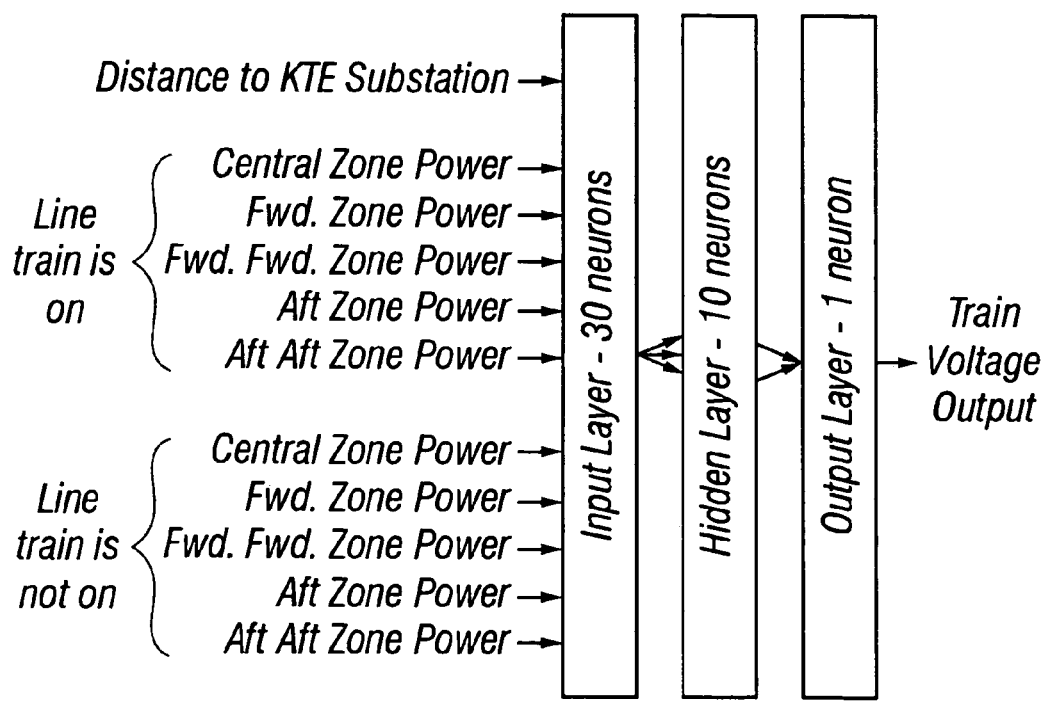
FIG. 3 illustrates a neural network input/output and layer architecture in accordance with the preferred embodiment of the present invention.

A block diagram of the feed-forward neural network is shown in FIG. 3. It shows the 11 inputs going into a layer of 30 neurons, a hidden layer of 10 neurons, and an output of layer of 1 neuron. The input layer requires a 12 by 30 weight array. There are 11 inputs to each neuron, one for each data input, and the extra input is for a bias weight input. Bias weight inputs are standard practice in neural networks and are used to compensate for any offsets in the data. The second layer or hidden layer uses a 31 by 10 weight array. Again, these include 30 inputs for each neuron from the previous layer's output and one bias weight for each neuron. The output layer has an 11 by 1 weight vector at its input, including 10 weights from the previous node and one bias weight. Basically, the neural network architecture and the 3 weight matrices are sufficient for implementing the network.

Although the neural network described herein includes the input layer containing 30 neurons, the hidden layer containing 10 neurons, and the output layer containing 1 neuron, other neural network architectures containing any number of neurons may be used in accordance with the present invention, so long as it is capable of predicting train voltages. Further, different number of inputs and weight arrays may be used in accordance with the present invention.

Train voltages can be measured on the system real-time, and this data can be used to train and refine the neural net to improve its accuracy, and thus to increase the effectiveness of the algorithm. The neural net in training could be periodically validated and then substituted for the previous version in the control algorithm.

The algorithm of the present invention can be active continuously. During nominal train control situations, the impact on train behavior will be minimal. During conditions of low train voltages, the algorithm prevents low voltages at trains.

Managing Interference

Interference During Acceleration

To maintain a safe following distance, trains are constrained to leave enough space in front of them to stop under the worst possible stopping scenario such as when there are communication failures and/or brake failures. The largest stopping distance for a train from a given location and speed is known as the Worst Case Stopping Distance (WCSD).

When two trains are close together and accelerate, the stopping distance of the following train increases because of its increased momentum, and oscillations in acceleration can result. If the following train accelerates at the same rate as the lead train, its stopping distance quickly overtakes the lead train, and it must stop accelerating. Once its following distance increases, the following train can resume accelerating. As can be appreciated, this cycle can be repeated until the trains reach the commanded speed.

To prevent this cycle from occurring, an enhanced control algorithm can be used to continuously adjust the acceleration rate of the following train. This algorithm prevents unnecessary mode changes (e.g., from accelerating to braking), thereby reducing wear-and-tear on the motors. It also improves system reliability, reduces the likelihood of low voltages, saves energy, and produces a more comfortable ride.

The algorithm according to the present invention can also be used to prevent unnecessary braking due to hills. The train's WCSD will increase if the average grade in front of the train becomes more down-sloped because it takes more distance to stop traveling downhill. If the following train is traveling as close as possible to the lead train, then the following train will need to brake as it approaches a downhill track section to leave adequate distance for the longer WCSD. The present invention causes the train to maintain a sufficient following distance at all times so that unnecessary braking is reduced/eliminated.

The algorithm according to the present invention can also be implemented in a situation where the lead train is traveling below the speed limit, and the following train repeatedly catches up, brakes, falls behind, and then accelerates back toward the speed limit. The present algorithm can prevent such a situation from occurring by controlling the speed of the following train.

The enhanced control algorithm causes each train to maintain sufficient following distance to prevent braking due to interference. The WCSD is first calculated as a function of location and speed. The "Maximum WCSD" (MaxWCSD) is then calculated as a function of location and speed. This function is the maximum WCSD at each speed between each location and the next station location. If the following distance of a train (the space between the lead train and the following train) is maintained at all times above this maximum stopping distance for its location and speed, then braking due to interference will not occur. To maintain this separation, when a train is accelerating close behind another accelerating train, its acceleration rate is calculated such that its following distance increases to match the increase in its MaxWCSD. If a train is following another train that is not accelerating but is traveling slowly, then the rear train slows down to comparable speeds with the lead train when it is following at its maximum stopping distance.

Figure 4:
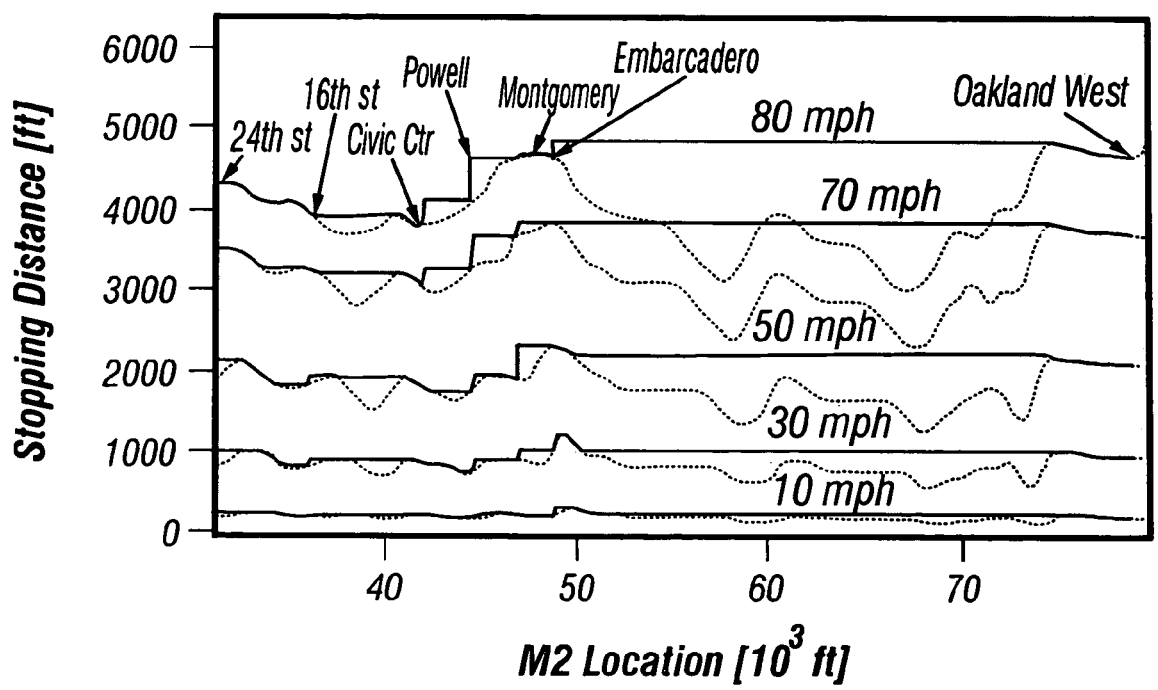
FIG. 4 illustrates an example of a plot of the worst case stopping distance and the maximum worst case stopping distance as functions of location and speed.

For a more comprehensive understanding, FIG. 4 illustrates an example of a plot of the WCSD and the MaxWCSD as functions of location and speed. The solid lines represent the MaxWCSD and the dashed lines represent the WCSD. The sample train station locations as illustrated in FIG. 4 are the 24$^{th}$ Street, 16$^{th}$ Street, Civic Center, Powell, Montgomery, Embarcadero, and Oakland West station on the Bay Area Rapid Transit (BART) M-Line.

Before detailing the algorithm for managing interference due to acceleration, it is worth noting the importance of accounting for time delays in the calculation of reduced acceleration commands. If there is a time delay DT between when the reduced acceleration command is calculated and when it goes into effect, and acceleration commands are generated without taking this delay into account, then the rear train will accelerate too fast and cyclical interference will still occur. Thus, it is important to predict the locations and speeds of the trains at a time DT in the future, and to use these rather than the current values to calculate the correct reduced acceleration rate.

Figure 5:
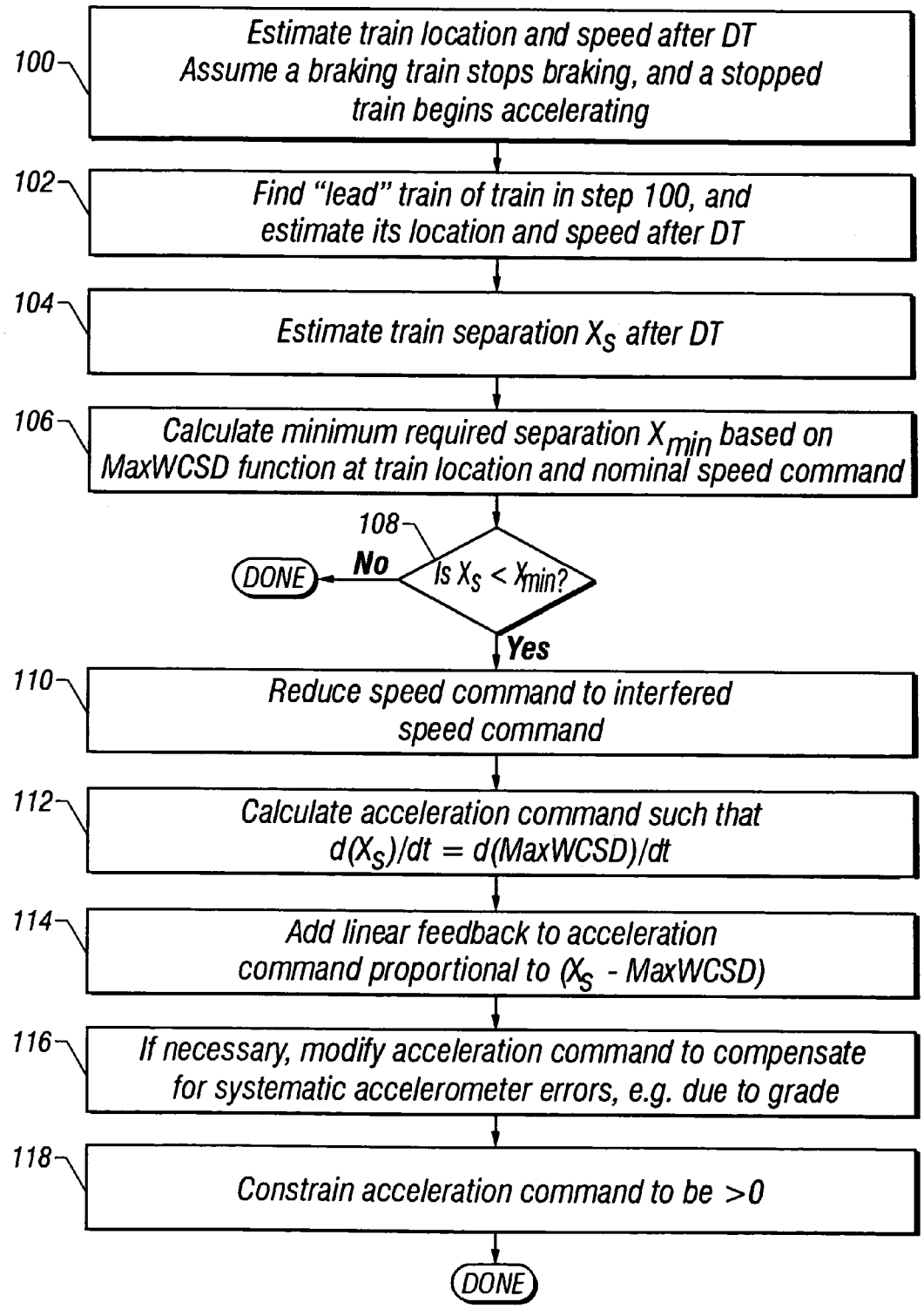
FIG. 5 illustrates a flow chart of a method for managing interference during acceleration in accordance with the preferred embodiment of the present invention.

FIG. 5 illustrates a flow chart of a method for managing interference during acceleration in accordance with the present invention. For a following train, in step 100, the present method begins by using the location, speed, and acceleration of the train to project the expected location and speed after DT. The expected location and speed are projected with the assumption that a braking train will stop braking, and thereby coast, and a stopped train will begin accelerating. In step 102, the location and speed after DT are projected for the train that is in front of, or leading the following train. In step 104, the train separation distance XS between the lead and following trains is estimated. Then, in step 106, the minimum required separation distance $X_{min}$ is calculated based on the MaxWCSD of the following train at the projected train location and the nominal speed command.

In step 108, $X_s$ is compared to $X_{min}$. If XS is greater than $X_{min}$, then the algorithm is completed. If, however, $X_s$ is less than $X_{min}$, the separation is insufficient, and the speed and acceleration commands for the following train must be reduced. In step 110, the speed command of the following train is first reduced to the interfered speed command, which is typically less than the nominal speed command. If the speed command of the following train is greater than that of the lead train, and the following train is at a lower speed than the lead train, then the following train's speed command is reduced to equal the lead train's speed command.

Next, to calculate the desired reduced acceleration command in step 112, it is assumed that the train separation is initially sufficient. The derivative of the train separation $[d(X_s)]$ with respect to time is set to be equal to the derivative of the MaxWCSD [d(MaxWCSD)] with respect to time. Thus, the desired reduced acceleration command is calculated so that the distance separating the two trains will increase as fast as the MaxWCSD increases. The resulting acceleration command is given by:

$$\frac{V_{lead} + A_{lead} * dt - V * (1 + dSD/dx)}{dt + dSD/dv}, \qquad (2)$$

where $V_{lead}$ is the speed of the lead train, $A_{lead}$ is the acceleration of the lead train, dt is the time increment between successive commands, V is the speed of the rear train, dSD/dx is the partial derivative of the MaxWCSD with respect to the location of the rear train, and dSD/dv is the partial derivative of the MaxWCSD with respect to the speed of the rear train. The MaxWCSD and the derivatives of this function with respect to location and speed are calculated based on the reduced speed command. All locations and speeds are those projected forward by time DT.

Next, in step 114, a small linear feedback term is added to the calculated reduced acceleration rate to compensate for the difference, if any, between the actual and the desired optimal following distance. For example, the following equation may be added to the acceleration command:

$$(X_s - \text{Max WCSD} - \text{FollowBuffer})/\text{DistDiv}, \qquad (3)$$

where $X_s$ is the projected separation between the trains after DT, MaxWCSD is evaluated at the projected train location and the reduced speed command of the following train after DT, Followbuffer is an additional buffer distance (e.g. 200 feet), and DistDiv (e.g. 400 feet) controls the strength of the feedback. If the train separation is more than desired, then the calculated acceleration command is increased by this term. If the separation is too small, the command is likewise decreased. This term (3) compensates for any accumulated small errors in the acceleration command calculation and causes the following distance to tend toward the desired distance.

Finally, in step 116, the acceleration command is modified to compensate for any systematic acceleration errors. For example, an on-board controller that only uses an accelerometer to determine the train acceleration is always in error due to the grade/slope. When traveling uphill, such trains accelerate slower than the acceleration command. Likewise, trains accelerate quicker traveling downhill. To compensate the acceleration command for hills, the acceleration due to the grade should be added on after the desired acceleration rate has been calculated and the feedback term (3) has been added. From the gravitational constant, acceleration due to grade is simply 32 ft/sec$^2$*grade. The average grade under the train at the time when the command goes into effect should be used rather than the average grade over the stopping distance. For example, for a train on a 2% uphill, 32 ft/sec$^2$*0.02=0.44 mph/sec should be added to the desired acceleration rate. Whether this grade compensation equation should be added to the calculated acceleration rate will depend on whether this accelerometer error is present.

A constraint placed on the present algorithm is that it should prevent a train from unnecessary braking, as indicated in step 118. If the calculated reduced acceleration rate becomes negative, indicating a need to decelerate, then the algorithm suggests a zero acceleration command, which corresponds to a coasting command. Likewise, a speed command less than the train speed should not be suggested. If necessary, the baseline control logic, which enforces safety constraints, will eventually command braking to slow the following train. This does occur, for example, if a train catches up to a slower train and must brake.

Interference Near Station Stops

In addition to the interference due to changes in stopping distance as described above, preventable acceleration cycles can also result when trains are close together in a region with closely spaced station stops. If a train is stopped in a station and another train approaches, the second train will begin to brake early to stop short of the station. Thus, the rear train goes through a brake-accelerate-brake sequence. Nominal train control systems will command a train to switch into propulsion, even if it will begin its station stop braking profile a moment later.

As with the interference during acceleration algorithm, the benefits of an algorithm to manage interference near station stops are smoother service, improved passenger comfort, reduced wear and tear on the motors, and reduced energy costs. In other words, the passengers are not being thrown back and forth as the train changes modes, the motors aren't changing modes as frequently, and energy is not being wasted by propulsion/braking cycles. There is little cost to overall trip-time in this case because interference will slow down the rear train with or without the algorithm running.

When a train is stopped at a station, the following train will generally brake before it reaches the station. Once the lead train leaves the station, the following train may stop braking and begin accelerating. In accordance with the present invention, the following train should accelerate if it is necessary to reach the station or if it will increase trip time excessively to continue braking. Otherwise, the following train should continue braking at the minimum rate (0.4 mph/s on certain systems) until it reaches the station. Other commuter train systems may have a minimum brake rate that is greater or less than 0.4 mph/s.

Figure 6:
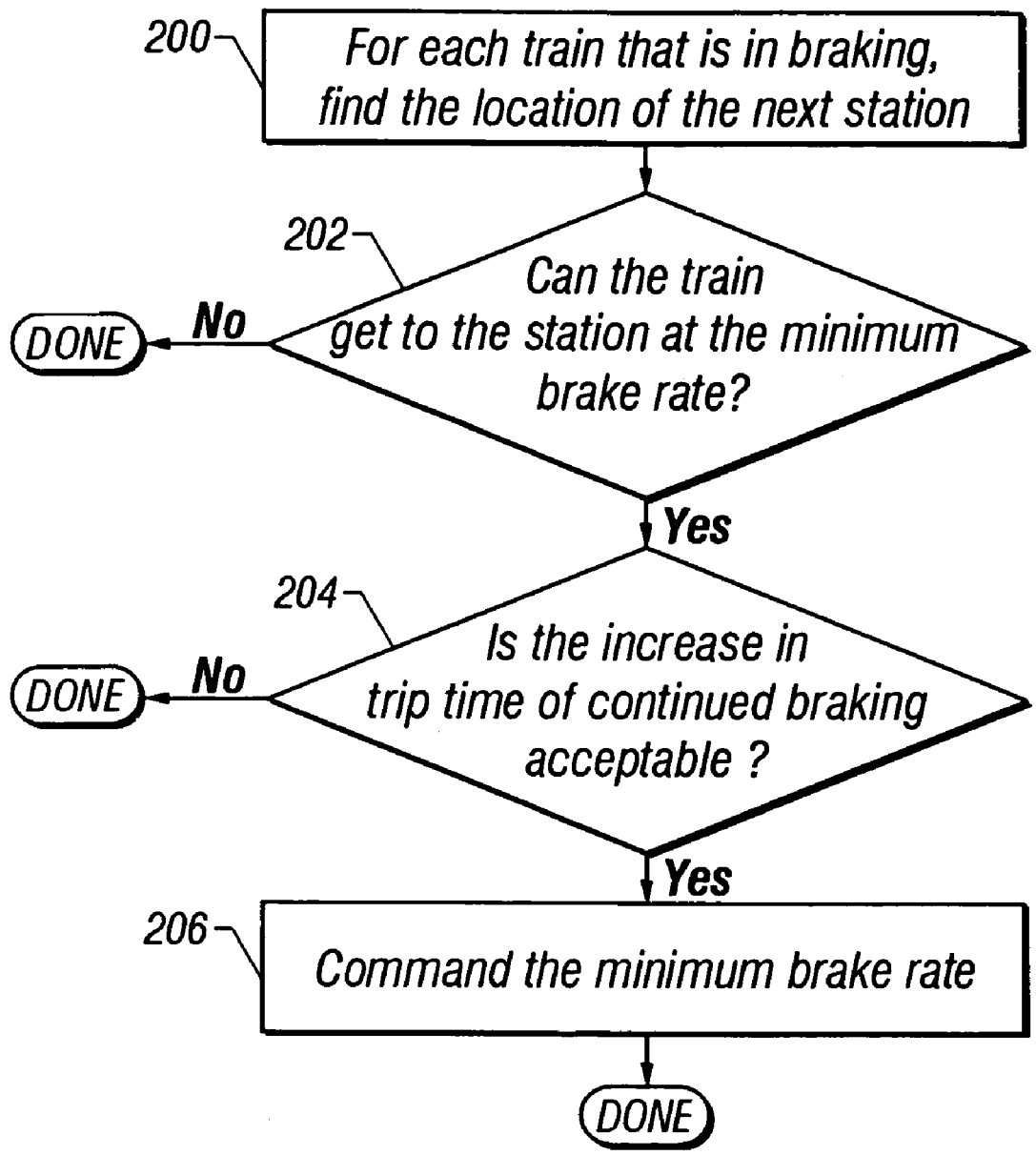
FIG. 6 illustrates a flow chart of a method for managing interference near station stops in accordance with the preferred embodiment of the present invention.

FIG. 6 illustrates a flow chart of a method for managing interference near station stops in accordance with the present invention. In step 200, the location of the next station is found for each train that is braking. Then, in step 202, it is determined whether the train can reach the station at the minimum brake rate. In step 202, it is assumed that the train can reach the station at the minimum brake rate of, for example, 0.4 mph/s if $$X_{station} - X_{train} < 1.8333 * V_{train}^2,$$

where $(X_{station} - X_{train})$ is the distance between the next station stop and the train in feet, and $V_{train}$ is the speed of the train in mph. The approximation assumed here and in the next equation is that the train trajectory is a simple constant acceleration, constant speed, and constant brake rate trajectory.

If the train can reach the station using the minimum brake rate in step 202, the next step 204 determines whether the increase in trip time is acceptable. The increase in trip time is estimated by comparing a trajectory of braking at, for example, 0.4 mph/s followed by a station stop at 2.2 mph/s, as compared to acceleration at 3 mph/s followed by braking at 2.2 mph/s. The resulting increase in trip time is given by $$2.8333 * V_{train} - 1.67 * ((1.833 * V_{train}^2) - X_{station} + X_{train})^{0.5} - 1.0365 * (0.2444 * V_{train}^2 + X_{station} - X_{train})^{0.5} -.$$

If this is less than some preset time, for example, 15 seconds, then the minimum brake rate command is sent to the train in step 206. Other acceleration rates and preset times may be substituted for ones used above in the present invention.

Interference During Delay Recovery

A long delay can lead to a backup, an extreme form of interference in which a line of trains sit one behind the other outside of a station. Under nominal control, the line moves forward one train length at a time as the trains pull into the station one after the other. In addition, trains approaching the delay continue on at full speed and then stop behind the delay. This situation leads to spikes in power demand, as the trains repeatedly accelerate and then brake, like a line of cars at a stop sign. In addition to the frustrating ride and the waste of energy, low voltages may result if sufficient power is not locally available for multiple accelerating trains. Although the low-voltage-avoiding algorithm can address this last problem, it is possible to use an algorithm to smoothly and efficiently recover from a backup, while avoiding simultaneous accelerations that can cause low voltages.

An algorithm has been developed that will handle such delays more smoothly than the conventional system. This algorithm prevents unnecessary motor mode changes, and can prevent extreme voltage sags if a delay occurs in an area with limited power availability. The algorithm also makes delay recovery a less noticeable event for the passengers.

A train typically stops outside of a station under abnormal circumstances, either because it has stopped behind a delayed train in the station or for some other reason. In either case, when a train stops outside of the station, the present algorithm recognizes that a delay has occurred and calculates reduced speed commands for any approaching trains to prevent them from stopping. If the delay continues for a prolonged period, some trains will be forced to stop in a backup behind the delayed train. When the delayed train finally begins to move, the algorithm staggers the starts of any stopped trains so as to avoid simultaneous acceleration which can lead to power spikes and voltages sags. In addition, any trains still approaching the area are controlled so as to avoid stopping. If additional delays occur to subsequent trains in the station, then the algorithm reduces the speeds of all approaching trains accordingly so that they will not be forced to stop. This capability is critical, since dwell times are unlikely to be exactly as scheduled for any number of reasons. As long as additional delays are on the order of the station dwell time or less, this approach is sufficient. However, a substantial delay to the second train can cause a backup to recur at the station. In this case, the algorithm will again keep track of stopped trains and slow down approaching trains as though this were a new event.

Under enhanced control, each train accelerates twice—once to come up to a calculated speed, and once to quickly pull into the station. Another version of the algorithm did not accelerate trains into the station, but rather maintained the approaching speed all the way to the station stop. The disadvantage of this approach is that the trip time of the train is increased because of its leisurely arrival at the station, and the headway (time) between trains departing the station is correspondingly increased. The present algorithm generates smooth train trajectories and optimizes the headway through the station. In order to match the trip time and headway capability of the baseline control, each train accelerates into the station as soon as the station is clear.

Figure 7:
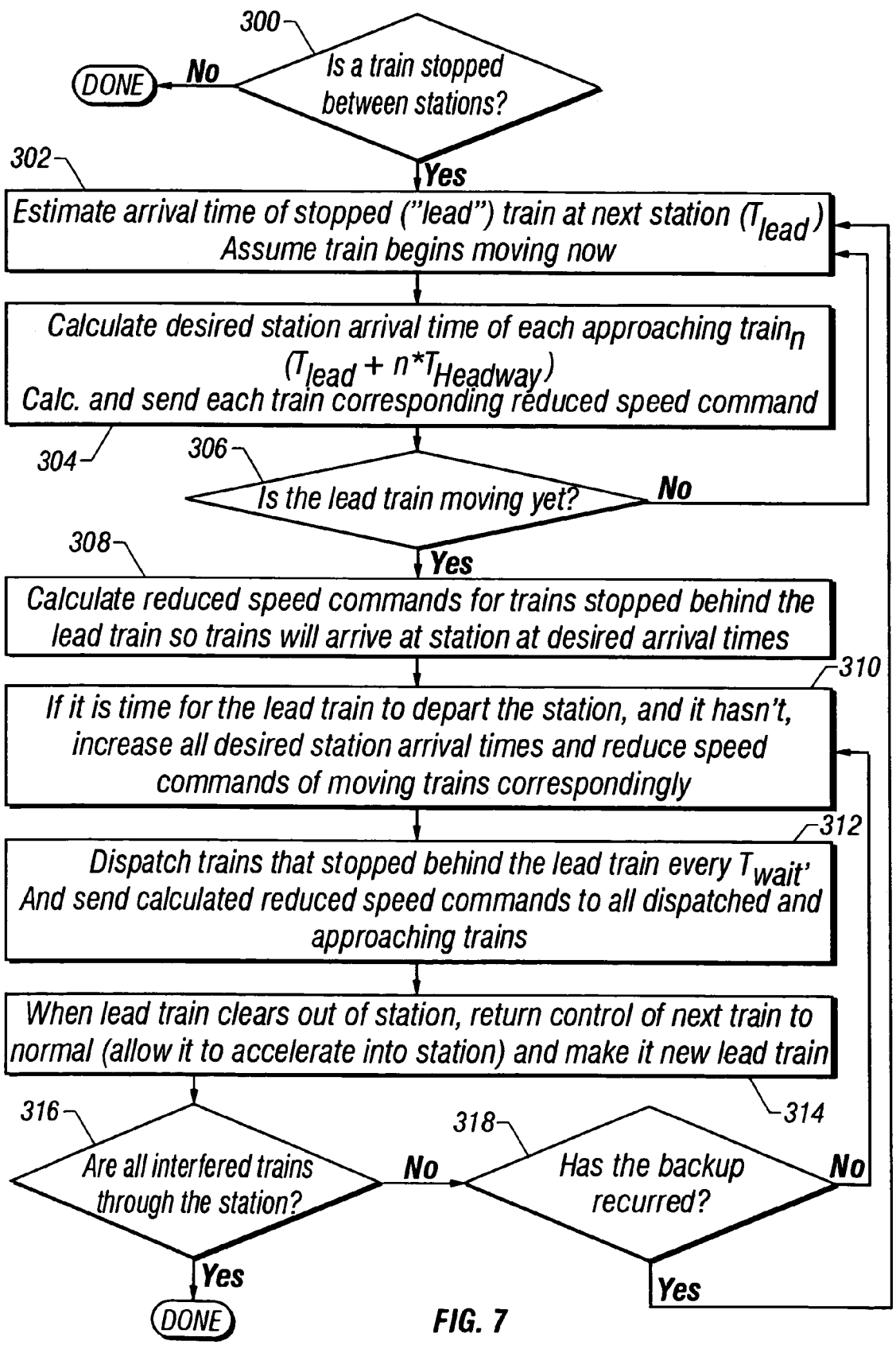
FIG. 7 illustrates a flow chart of a method for managing interference during delay recovery in accordance with the preferred embodiment of the present invention.

FIG. 7 illustrates a flow chart of a method for managing interference during delay recovery in accordance with the present invention. In order to keep track of all of the trains stopped in the delay, as well as the trains restarted after the delayed train moves, and the trains approaching the area, there are multiple train arrays and indices in the algorithm. In addition, the algorithm must keep track of the phase of the delay-clearing process (e.g., has the lead delayed train moved yet?). As a result, the codified algorithm logic is quite complex and has been simplified somewhat for the purposes of the flow chart of FIG. 6. Unlike the flow charts shown for the previous algorithms, FIG. 6 shows not a single control time step, but rather the entire time that the algorithm is active.

In step 300, the first step is to determine whether there is a train stopped in between stations. If there are no trains stopped in between stations, then generally there is no interference from delay recovery and there is no need to proceed with the algorithm. If, however, there is a train stopped in between stations, then the algorithm is activated and the stopped train is designated the "lead" train. In step 302, the arrival time $T_{lead}$ of the lead train at the next station is estimated assuming that it begins to move immediately. In step 304, based on $T_{lead}$, the desired arrival times at the station of each following train, $train_n$, are calculated. The reduced speed commands are then sent to each approaching $train_{n'}$.

The present method attempts to have trains arrive at the next station spaced by $T_{Headway}$ e.g. 80 seconds. In order to accomplish this, while the delayed train causing the backup is still stationary, it is assumed that it will dispatch immediately. (The cause of the delay is assumed to be unknown, and therefore the train may dispatch at any time.) Based on this assumption, and assuming a constant acceleration, constant speed, and constant brake rate trajectory from its current location to the station, the approximate station arrival time of the lead train, $T_{lead}$, is calculated. All trains approaching the backup are then commanded with reduced speed commands that would cause them to arrive at the station at intervals of $T_{Headway}$ after the lead train's estimated arrival time. These speed commands are calculated assuming a constant speed until a predetermined distance short of the station and a predetermined number of seconds short of the desired arrival time. This buffer distance and time approximately accounts for the last phase of the trajectory, when the train accelerates into the station and then stops. These numbers, e.g. 850 feet and 40 seconds, are derived empirically.

The steps 302 and 304 are repeated until the lead train finally begins to move in 306. Up to this time, the speed commands of the approaching trains gradually decrease as they get closer to the stopped train. If the delay continues for a long time, some trains will eventually be forced to stop behind the lead train. Once the lead train begins moving, the stopped trains are dispatched at intervals of $T_{wait}$. This time is chosen to be on the order of the time for a stopped train to accelerate up to speed, e.g. 25 seconds. If each train in a line of stopped trains waits for this long to begin accelerating after the train in front of it begins to move, then power consumption will be nearly limited to a single accelerating train at a time, thus avoiding peak power or low voltage problems.

After the lead train moves, in step 308, reduced speed commands are calculated for each stopped train assuming they will be dispatched every $T_{wait}$. These commands are calculated in a similar manner as the approaching train speed command calculation described above, but in this case each train is assumed to accelerate up to speed and then travel at a constant speed until it is near the station. If any train approaching the backup is forced to stop while the backup is clearing, then a reduced speed command will be calculated for that train in the same way.

Until the time when the lead train is expected to depart from the station, the speed commands of all approaching trains and dispatched stopped trains are held constant. Each command time step after the expected station departure time, if the lead train is still in the station, then the target arrival times of all following trains are increased to match in step 310. In addition, the speed commands of all moving trains are decreased by subtracting the term $$\frac{V_{train}^2 * T_{delay}}{D_{station}}, \tag{4}$$

where $V_{train}$ is the train speed, $T_{delay}$ is the delay time since the expected station dispatch time (or the last time the speed was adjusted), and $D_{station}$ is the distance from the train to the station.

In step 312, stopped trains are dispatched and reduced speed commands are implemented as calculated in the previous steps. In step 314 when the lead train departs the station, the next train behind it becomes the new "lead" train. This train then accelerates to the station stop. Steps 310 through 314 continue to operate until all of the trains that are interfered (close enough to the backup to have been slowed down by it) have been dispatched from the station, or until the backup is found to recur. In step 316, if all interfered trains have not yet moved through the station, the algorithm continues to operate. In step 318, if a train that had been restarted has stopped again between stations, then the backup has recurred and the entire process begins again starting from step 302. However, if a backup has not recurred, then steps 310 through 314 continue to be repeated.

Figure 8B:
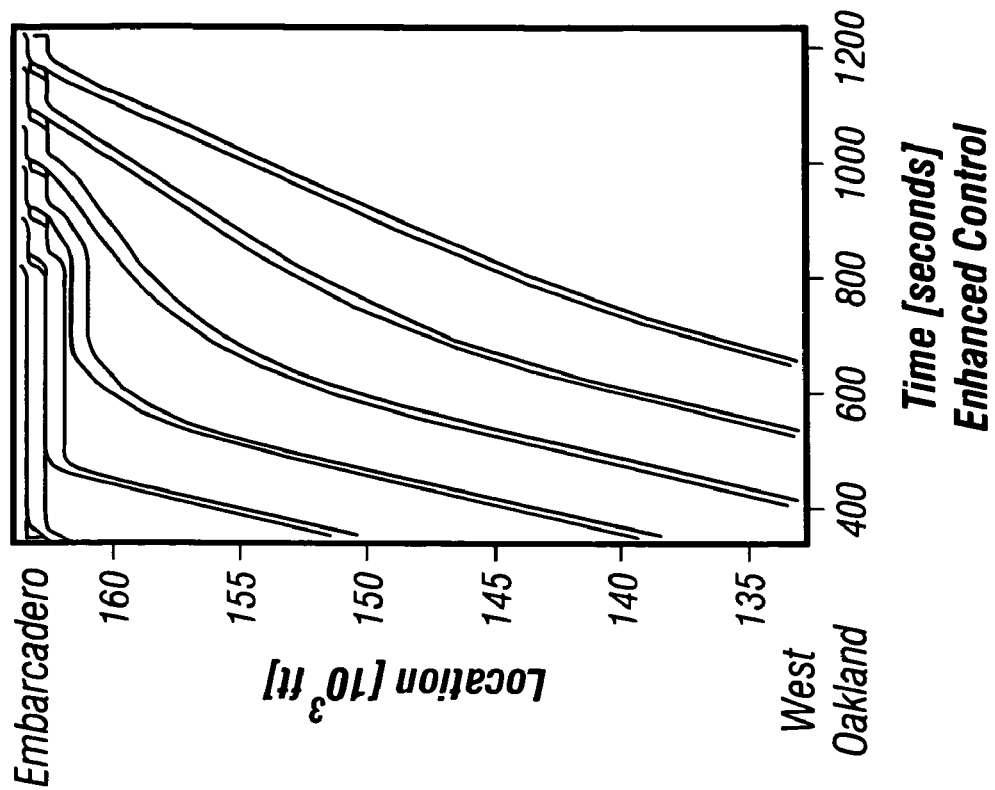
FIGS. 8(a) and 8(b) illustrative examples of delay recovery, with nominal control shown in FIG. 8(a) and enhanced control (as illustrated in FIG. 7) shown in FIG. 8(b).
Figure 8A:
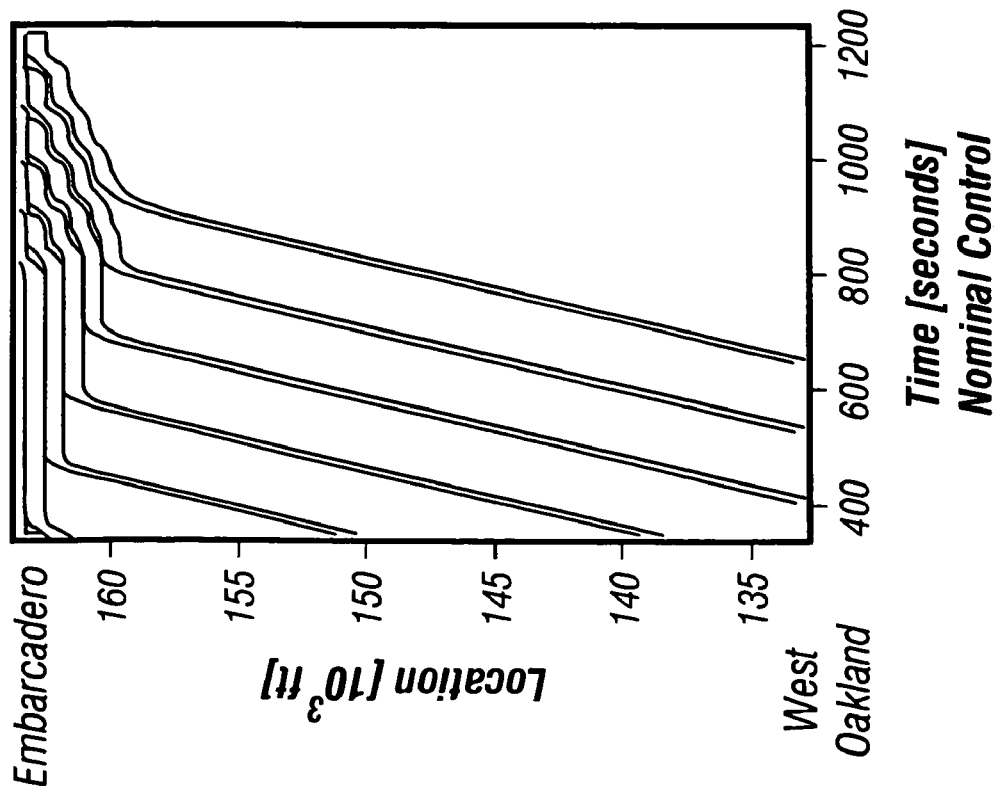

For clarification, examples of trains under nominal versus enhanced control is shown in FIGS. 8(a) and 8(b), which shows a delay in a station followed by close to nominal station dwell times. FIG. 8(a) shows an example of delay recovery with nominal control and FIG. 8(b) shows an example with enhanced control. Both graphs show the full lengths of each train as a shaded region along the location axis. The trajectory is flat when a train is topped, and slopped when it is in motion. Thus, comparing both graphs, the trains exhibit smoother trajectories, with fewer stops and starts, using the enhanced control.

In the previous descriptions, specific examples are set forth to provide a thorough understanding of the present invention. However, as one having ordinary skill in the art would recognize, the present invention can be practiced without resorting to the details specifically set forth.

Although various preferred embodiments of the present invention have been disclosed for illustrative purposes, those skilled in the art will appreciate that various modifications, additions and/or substitutions are possible without departing from the scope and spirit of the present invention as disclosed in the claims.

I claim:

1. A method of managing interference during delay recovery in a commuter train system, the method comprising the steps of:
    estimating an arrival time of a lead train into a destination station, wherein the lead train comprises a train that is stopped in between train stations;
    calculating desired arrival times of approaching trains into the destination station, wherein the approaching trains are behind the lead train;
    restarting each of the approaching trains that have stopped behind the lead train at intervals and with reduced speed commands;
    reducing the speed commands of each stopped train that are stopped behind the lead train such that each stopped train arrives at the destination station at desired arrival times;
    dispatching each of the stopped trains at time intervals so that the stopped trains do not all accelerate simultaneously; and
    reducing the speed of each of the approaching trains that have not stopped behind the lead train.

2. A method according to claim 1 further comprising the step of increasing the desired arrival times of all the approaching trains into the destination station when the lead train has not left the destination station at an expected departure time.

3. A method according to claim 1 further comprising the step of reducing the speed of each of the approaching trains such that each approaching train arrives at the destination station at desired arrival times.

4. A method according to claim 1, wherein each train accelerates into the destination station as soon as the station is clear.

5. A method according to claim 1, wherein the speeds of all trains approaching the destination station are reduced if the lead train experiences further delays.

6. A method of managing interference during delay recovery in a commuter train system, the method comprising the steps of:
    estimating an arrival time of a lead train at a particular location, wherein the lead train comprises a train that is stopped in between train stations;
    calculating desired arrival times of following trains at the particular location based on estimated arrival time of the lead train, wherein the following trains are behind the lead train; and
    adjusting the speed commands of the following trains such that the following trains will arrive at the particular location at the desired arrival times, wherein the desired arrival times are increased and the speed commands are reduced for each of the following trains as a result of increasing the arrival time of the lead train.

7. A method according to claim 6, wherein the particular location comprises a train station.

* * * * *